(12) United States Patent
Gorcea (10) Patent No.: US 6,754,288 B2
(45) Date of Patent: Jun. 22, 2004

(54) LINE RECEIVER WITH IMPROVED DYNAMIC RANGE

(75) Inventor: Dan V. Gorcea, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 551 days.

(21) Appl. No.: 09/746,421

(22) Filed: Dec. 26, 2000

(65) Prior Publication Data

US 2002/0114381 A1 Aug. 22, 2002

(51) Int. Cl.[7] .............................................. H04L 25/10
(52) U.S. Cl. ...................................... 375/318; 327/558
(58) Field of Search ............................... 375/220, 222, 375/257, 285, 316, 317, 318; 327/311, 316, 323, 329, 553–555, 558, 557, 344; 330/260–261, 278, 282, 284, 291, 293

(56) References Cited

U.S. PATENT DOCUMENTS

| | | | | |
|---|---|---|---|---|
| 4,783,635 A | * | 11/1988 | Sevastopoulos | 330/107 |
| 4,868,516 A | * | 9/1989 | Henderson et al. | 330/86 |
| 5,440,270 A | * | 8/1995 | Sevastopoulos et al. | 330/107 |
| 6,344,773 B1 | * | 2/2002 | Sevastopoulos et al. | 327/558 |
| 6,618,579 B1 | * | 9/2003 | Smith et al. | 455/307 |

* cited by examiner

Primary Examiner—Tesfaldet Booure
Assistant Examiner—Khanh Cong Tran (57) ABSTRACT

A receiver which may be an xDSL receiver has improved dynamic range. The receiver has a first amplifier, a network of four impedances and a variable gain second amplifier. The variable gain second amplifier has an input connected to an ouput of the first amplifier, an output connected to the first amplifier, and a variable gain control input. The gain of the variable gain second amplifier is

$$\frac{1}{K},$$

and the pass-band gain of the receiver is K. By controlling the gain of the receiver with an AGC (automatic gain control), the receiver can amplify and filter inputs over a wide dynamic range with lower distortion and without saturation. Alternatively, the gain of the variable gain second amplifier is $$-\frac{1}{K}.$$

The four impedances can be arranged to realise low-pass or high-pass filters.

24 Claims, 6 Drawing Sheets

LINE RECEIVER WITH IMPROVED DYNAMIC RANGE

FIELD OF THE INVENTION

This invention relates generally to line receivers and particularly to line receivers having desirable dynamic range and filtering capabilities in a single amplifier stage.

BACKGROUND OF THE INVENTION

DSL (digital subscriber line) is a technology for bringing high-bandwidth information to homes and small businesses over ordinary copper telephones lines. xDSL refers to different variations of DSL such as ADSL (asymmetric DSL), G.Lite DSL (ITU-T standard G-992.2), HDASL (high bit-rate DSL) and RADSL (rate-adaptive DSL).

DSL modems are typically installed in pairs, with one of the modems installed in a home (customer's premises) and the other in the telephone company's central office servicing that home. The pair of xDSL modems are connected to the opposite ends of the same twisted-pair transmission line.

Figure 1:
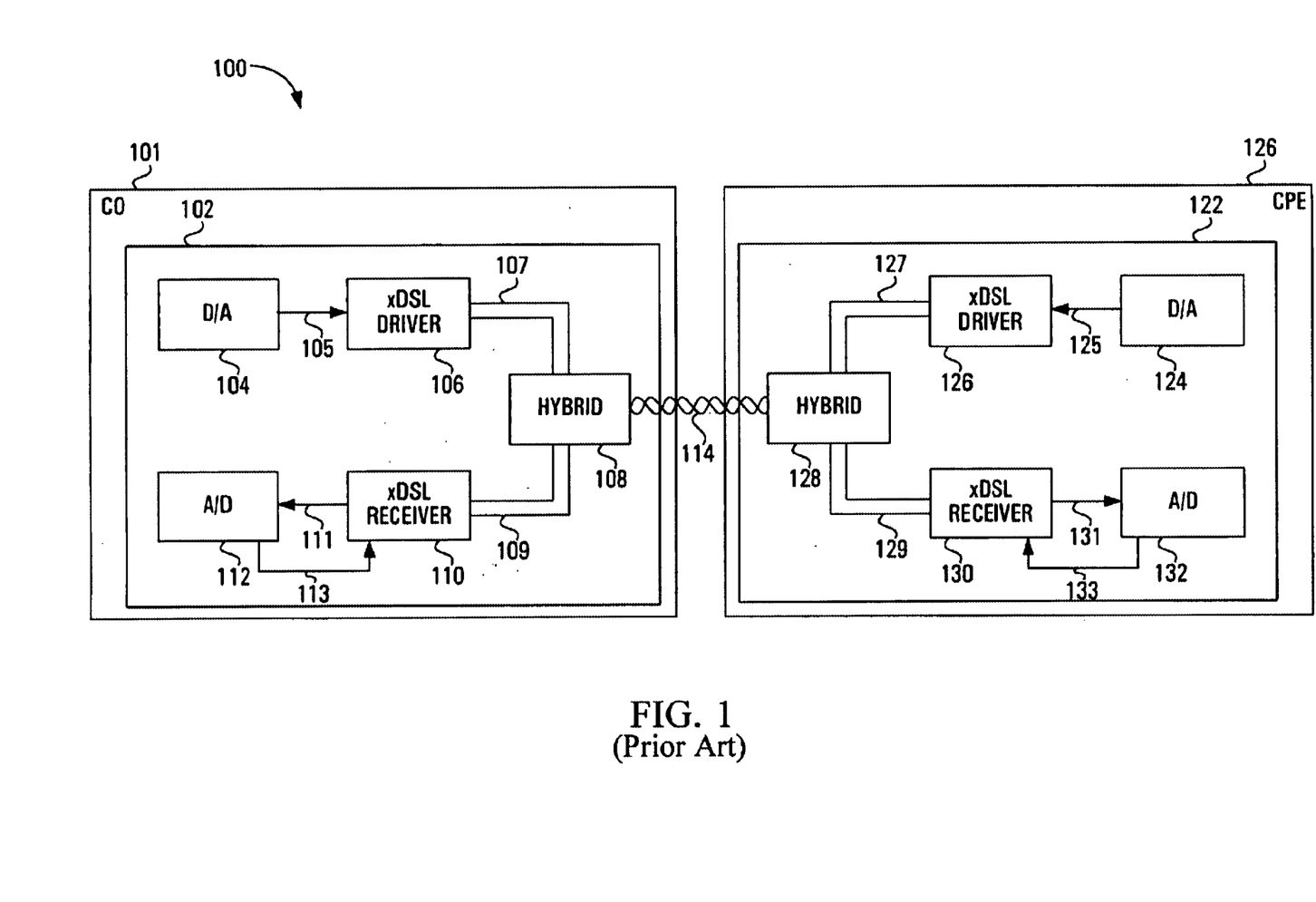
FIG. 1 is a block diagram of a conventional xDSL communication system.

Referring to FIG. 1 a conventional xDSL communication system 100 comprises a CO (central office) 101. The CO 101 has a plurality of xDSL modems 102 (only one shown). The xDSL modem 102 has a D/A (digital to analog) converter 104. An output of the D/A converter 104 is connected 105 to an input of an xDSL driver 106. An output of the xDSL driver 106 is connected 107 to a 4-wire input of a hybrid 108. A 4-wire output of the hybrid 108 is connected 109 to an input of an xDSL receiver 110. An output of the xDSL receiver 110 is connected 111 to the input of an A/D (analog to digital) converter 112. An AGC (automatic gain control) output of the A/D converter 112 is connected 113 to an AGC input of the xDSL receiver 110. A 2-wire port of the hybrid 108 is connected to a transmission line 114, such as copper twisted pair.

The xDSL communication system 100 also comprises CPE (customer premises equipment) 126. The CPE 126 has an xDSL modem 122 having a D/A converter 124. An output of the D/A converter 124 is connected 125 to an input of an xDSL driver 126. An output of the xDSL driver 126 is connected 127 to a 4-wire input of a hybrid 128. A 4-wire output of the hybrid 128 is connected 129 to an input of an xDSL receiver 130. An output of the xDSL receiver 130 is connected 131 to an input of an A/D converter 132. An AGC output of the A/D converter 132 is connected 133 to an AGC input of the xDSL receiver 130. The 2-wire port of the hybrid 128 is connected to the transmission line 114.

Figure 2:
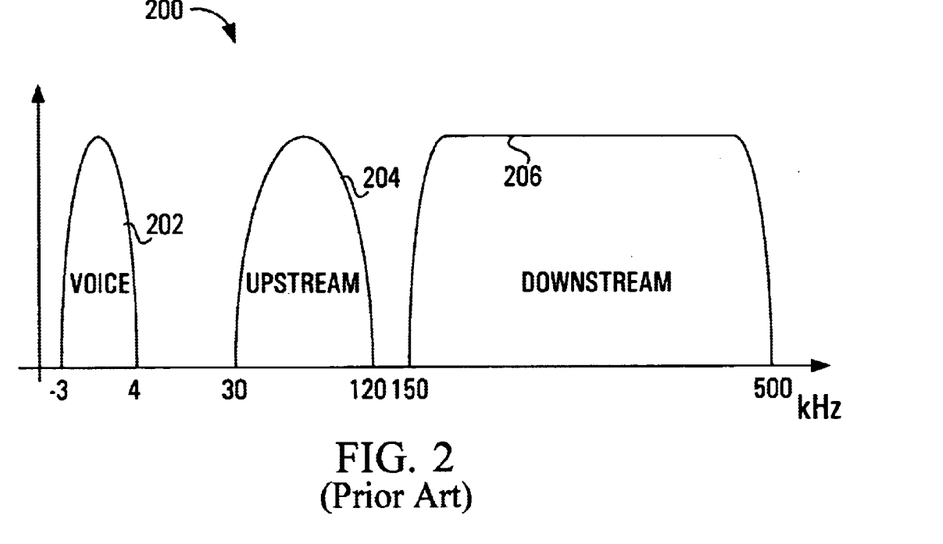
FIG. 2 is a frequency spectrum plan of a G.Lite DSL communication system.

Since an xDSL modem operates at frequencies higher than the voice-band frequencies, an xDSL modem may operate simultaneously with a voice-band modem or a telephone conversation. Referring to FIG. 2, there is shown an example of a frequency spectrum plan 200 for a G.Lite DSL system on the transmission line 114 of FIG. 1. The frequency range from 0.3 to 4 kHz 202 is occupied by conventional voice communications. The frequency range from 30 to 120 kHz 204 is occupied by upstream (CPE 126 to CO 101) data transmission. The frequency range from 150 kHz to approximately 500 kHz 206 is occupied by downstream (CO 101 to CPE 126) data transmission. The upper frequency limit of the downstream data transmission is determined by the length and quality of the transmission line 114.

A problem in xDSL communications systems is that the hybrid 108 in the CO 101 does not provide adequate isolation between the xDSL driver 106 in the CO 101 and the xDSL receiver 110 in the CO 101. Similarly, the hybrid 128 in the CPE 126 does not provide adequate isolation between the xDSL driver 126 in the CPE 126 and the xDSL receiver 130 in the CPE 126. This lack of isolation causes unwanted noise, distortion and saturation.

Figure 3:
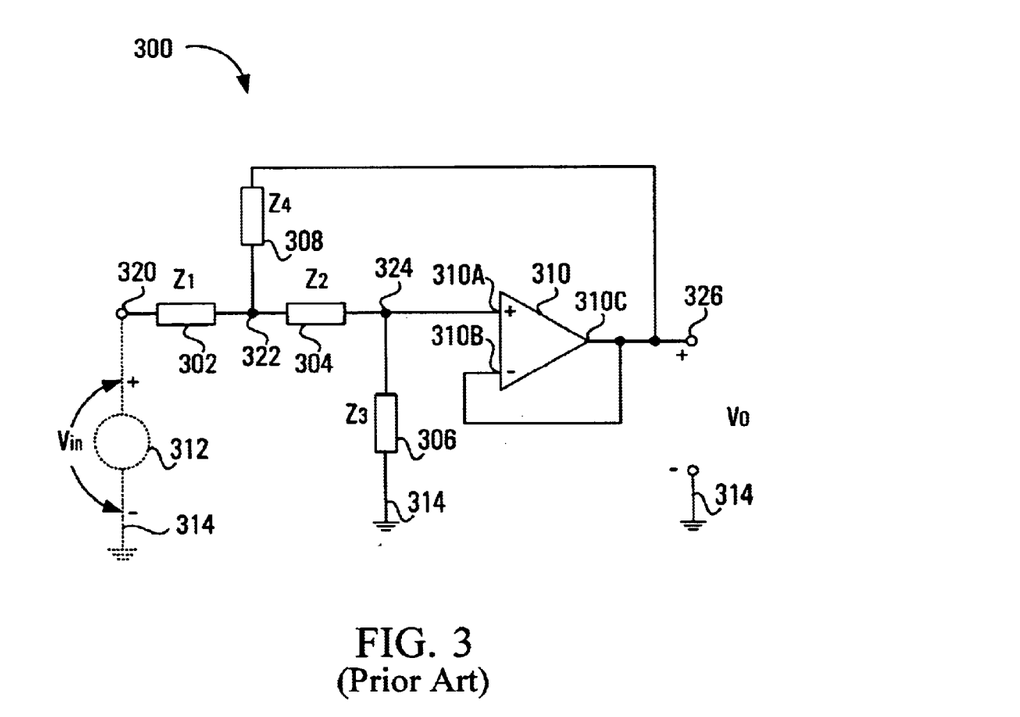
FIG. 3 is a circuit diagram of a conventional Salen and Key circuit.

One possible solution is to use a Salen and Key circuit for the xDSL receiver 110 and the xDSL receiver 130 of FIG. 1. Referring to FIG. 3, there is shown a conventional implementation of a Salen and Key circuit 300 that comprises a first impedance 302 ($Z_1$) having a first terminal connected to an input node 320 and a second terminal connected to a first junction node 322; a second impedance 304 ($Z_2$) having a first terminal connected to the first junction node 322 and a second terminal connected to a second junction node 324; a third impedance 306 ($Z_3$) having a first terminal connected to the second junction node 324 and a second terminal connected to a ground reference 314; a fourth impedance 308 ($Z_4$) having a first terminal connected to the first junction node 322 and a second terminal connected to an output node 326; and an amplifier 310 that is preferably an operational amplifier (opamp) having a non-inverting input 310A connected to the second junction node 324, an output 310C connected to the output node 326 and an inverting input 310B connected to the output 310C. The input node 320 is connectable to a voltage source (shown in dotted outline at 312) such as a 4-wire output of a hybrid. The output node 326 is connectable to a load (not shown) such as an input of an A/D converter.

In the xDSL receiver 110 in the CO 101 the downstream data transmission 206 must be rejected and the upstream data transmission 204 be passed. It is therefore advantageous that the xDSL receiver 110 in the CO 101 be a low-pass filter. To this end, referring to FIG. 3, the first impedance 302 and second impedance 304 are implemented as resistors while the third impedance 306 and fourth impedance 308 are implemented as capacitors. The values of the four impedances 302, 304, 306,308 are chosen such that the cut-off frequency of the low-pass filter is between the frequency of the upstream data transmission and the frequency of the downstream data transmission. For example, in the case of G.Lite DSL, the cut-off frequency would be between 120 kHz and 150 kHz.

Conversely, in the xDSL receiver 130 in the CPE 126 the upstream data transmission 204 must be rejected and the downstream data transmission 206 be passed. It is therefore advantageous that the xDSL receiver 130 in the CPE 126 be a high-pass filter. To this end, referring to FIG. 3, the first impedance 302 and second impedance 304 are implemented as capacitors while the third impedance 306 and fourth impedance 308 are implemented as resistors. The values of the four impedances 302, 304, 306, 308 are chosen such that the cut-off frequency of the high-pass filter is between the frequency of the upstream data transmission and the frequency of the downstream data transmission. For example, in the case of G.Lite DSL, the cut-off frequency would be between 120 kHz and 150 kHz.

A problem with the conventional Salen and Key circuit of FIG. 3 is that the pass-band gain is fixed. As well, the dynamic range is limited by the presence of leakage from the xDSL drivers 106, 126 through the hybrids 108, 128.

Figure 4A:
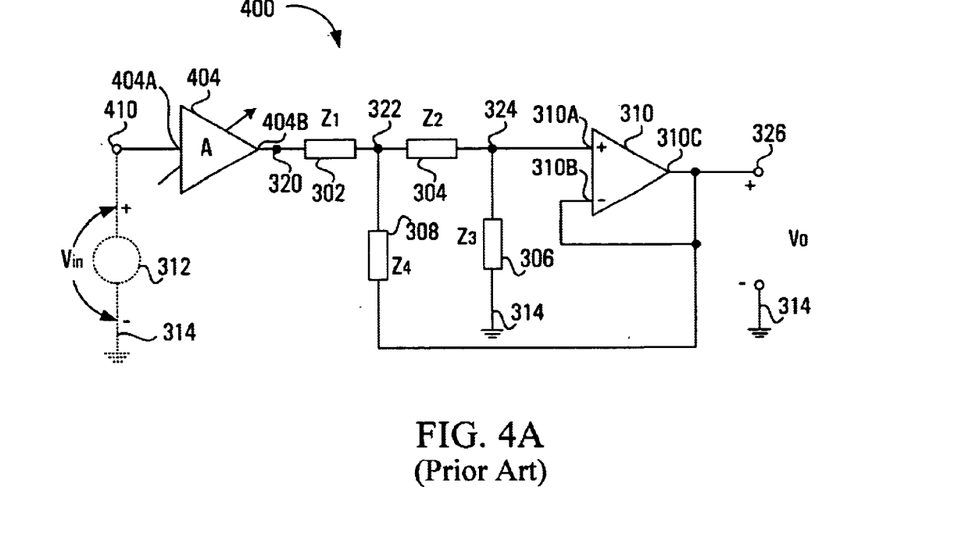
FIGS. 4A and 4B are circuit diagrams of conventional xDSL receivers.
Figure 4B:
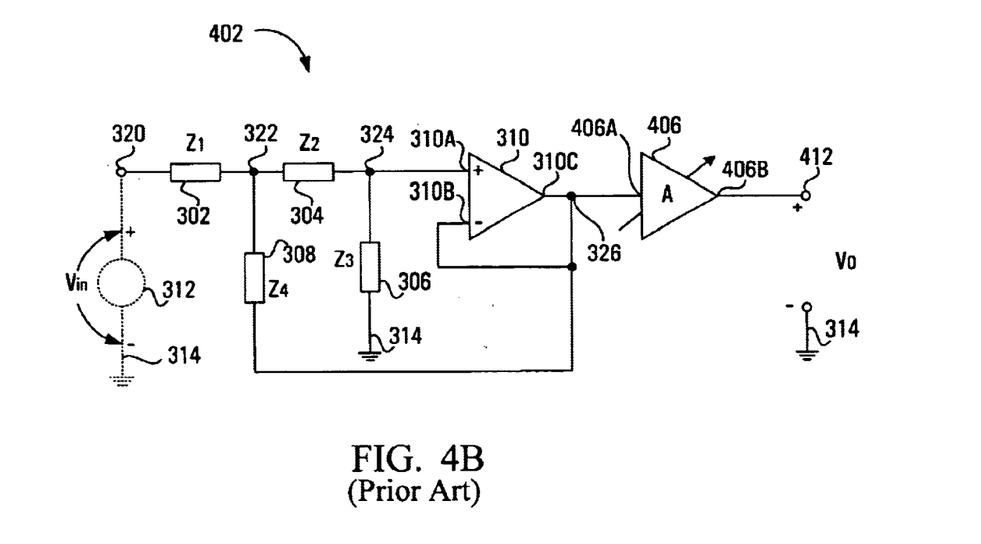

Two possible solutions are shown in FIGS. 4A and 4B. In FIG. 4A the topology is the same as FIG. 3 except that an adjustable gain amplifier 404 having an input 404A and an output 404B is inserted such that the output 404B is connected to the input node 320. However, there is no protection against large interfering signals in the adjustable gain amplifier 404. In FIG. 4B the topology is the same as FIG. 3 except that an adjustable gain amplifier 406 having an input 406A and an output 406B is inserted such that the input 406A is connected to the output node 326. However, the circuits of FIGS. 4A and 4B have the disadvantages of high noise, high power, distortion and complexity.

Thus there is a need in the industry to provide an xDSL receiver with improved dynamic range. Furthermore, it would be advantageous to provide an xDSL receiver that would also have filtering capabilities, low power consumption, less complexity and good noise figure.

SUMMARY OF THE INVENTION

The invention may be summarised according to a first broad aspect as a line receiver having an input and an output, equipped with an amplifier that is preferably an operational amplifier, a network of four impedances and a variable gain amplifier. The first impedance is connected from the input of the line receiver to a first junction node, the second impedance is connected from the first junction node to a second junction node, the third impedance is connected from the second junction node to a ground reference and the fourth impedance is connected from the first junction node to a third junction node. The amplifier has a non-inverting input connected to the second junction node, an inverting input connected to the third junction node and an output connected to the output of the line receiver. The variable gain amplifier has an input connected to the output of the line receiver, an output connected to the third junction node and an AGC input.

In accordance with this first broad aspect of the invention the variable gain amplifier has a gain of $$\frac{1}{K}$$

where K>0 and is set by the AGC input. The network of four impedances can be arranged to realise a low-pass or a high-pass filter.

The invention may be summarised according to a second broad aspect as a line receiver having an input and an output, equipped with an amplifier that is preferably an operational amplifier, a network of four impedances and a variable gain amplifier. The first impedance is connected from the input of the line receiver to a first junction node, the second impedance is connected from the first junction node to a second junction node, the third impedance is connected from the second junction node to a ground reference, the fourth impedance is connected from the first junction node to a third junction node. The amplifier has an inverting input connected to the second junction node, an non-inverting input connected to the third junction node and an output connected to the output of the line receiver. The variable gain amplifier has an input connected to the output of the receiver, an output connected to the third junction node and an AGC input.

In accordance with this second broad aspect of the invention the variable gain amplifier has a gain of $$-\frac{1}{K}$$

where K>0 and is set by the AGC input. The network of four impedances can be arranged to realise a low-pass or a high-pass filter.

Other aspects and features of the present invention will become apparent to those ordinarily skilled in the art upon review of the following description of the specific embodiments of the invention in conjunction with the accompanying figures.

DETAILED DESCRIPTION OF THE PREFERRED EMBODIMENTS

Figure 5:
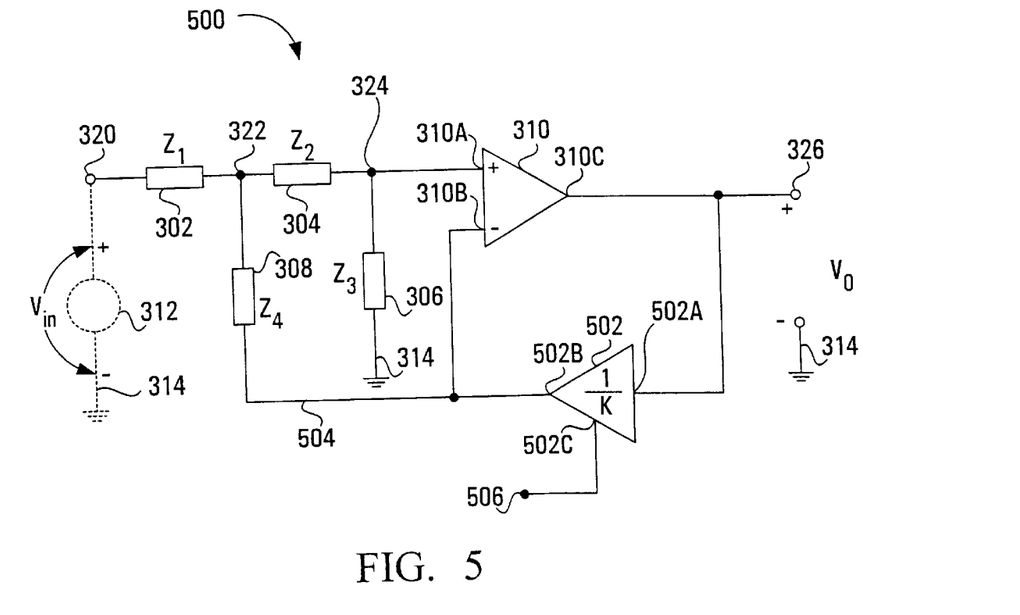
FIG. 5 is a circuit diagram of a preferred embodiment of the invention.

In order to provide an xDSL receiver with improved dynamic range the circuit of FIG. 5 is proposed. FIG. 5 shows a line receiver 500 comprising a first impedance 302 (having a value of $Z_1$) having a first terminal connected to an input node 320 and a second terminal connected to a first junction node 322; a second impedance 304 (having a value of $Z_2$) having a first terminal connected to the first junction node 322 and a second terminal connected to a second junction node 324; a third impedance 306 (having a value of $Z_3$) having a first terminal connected to the second junction node 324 and a second terminal connected to a ground reference 314; a fourth impedance 308 (having a value of $Z_4$) having a first terminal connected to the first junction node 322 and a second terminal connected to a third junction node 504; an amplifier 310 that is preferably an operational amplifier (opamp) having a non-inverting input 310A connected to the second junction node 324, an inverting input 310B connected to the third junction node 504 and an output 310C connected to an output node 326 having a voltage $V_O$ with respect to ground; and a variable gain amplifier 502 having an input 502A connected to the output node 326, an output 502B connected to the third junction node 504 and an AGC (automatic gain control) input 506. The output node 326 is connectable to a load (not shown) such as, for example, the input of an A/D converter and has a voltage having a value of $V_O$ with respect to the ground reference 314. The input node 320 is connectable to a voltage source 312 (shown in dotted outline), such as a 4-wire input of a hybrid, having a value of $V_{in}$ with respect to the ground reference 314. The AGC input 502C is connected to a AGC feedback signal 506. The AGC feedback signal 506 may be, for example, a digital serial or parallel bus connected to an AGC output of an A/D converter as shown in FIG. 1 at 113 and 133. The gain of the variable gain amplifier 502 is $$\frac{1}{K}$$

where K is a real number greater than zero. The value of K is set by the AGC feedback signal 506.

Figure 6A:
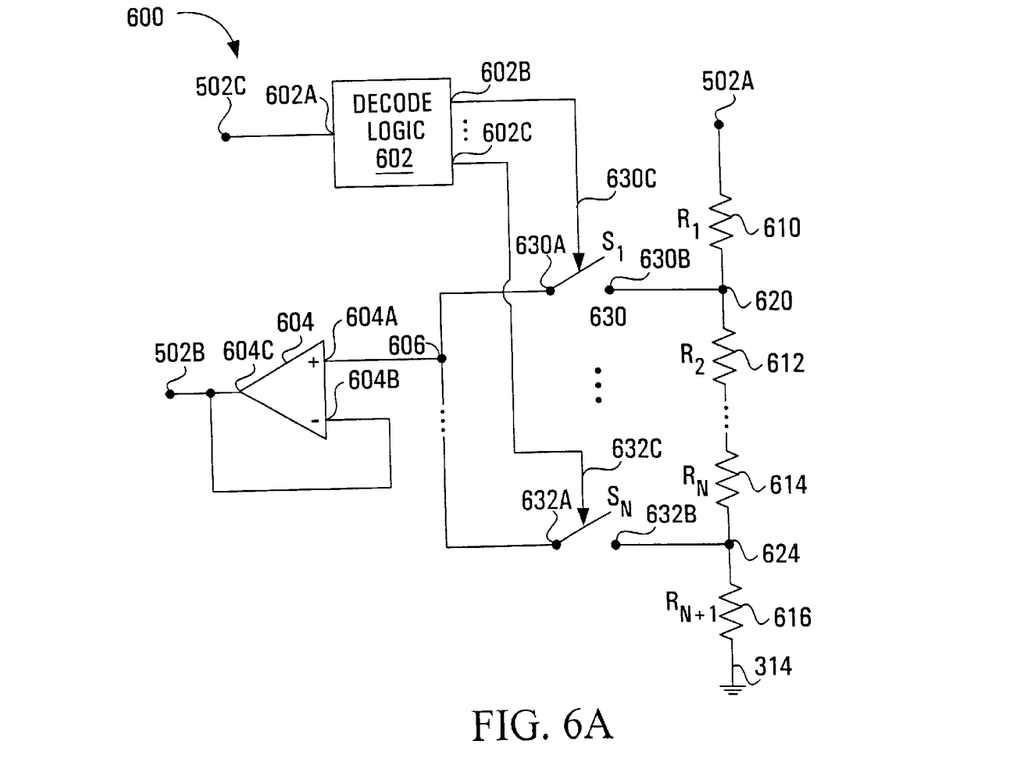
FIG. 6A a circuit diagram showing more detail of a variable gain amplifier used in the preferred embodiment of FIG. 5.

FIG. 6A shows one possible implementation of the variable gain amplifier 502 of FIG. 5 that comprises a buffer amplifier 604 that is preferably an operational amplifier having a non-inverting input 604A connected to a junction node 606, an output 604C connected to the output 502B of the variable gain amplifier 502 and an inverting input 604B connected to the output 604C of the buffer amplifier 604. The variable gain amplifier 502 also comprises a decode logic circuit 602 that has an input 602A that is connected to the AGC input 502C of the variable gain amplifier 502 and a plurality of outputs 602B, 602C (only two shown). The variable gain amplifier 502 also comprises a plurality (N) of switches 630, 632 (only two shown) with each switch 630, 632 having a first terminal 630A, 632A connected to the junction node 606, a control input 630C, 632C connected to the respective output 602B, 602C of the decode logic circuit 602 and a second terminal 630B, 632B. The switches 630, 632 may be, for example, N-channel, P-channel or CMOS transistors. The variable gain amplifier 502 also comprises a plurality (N+1) of resistors (only four shown) that are shown as a first resistor 610, a second resistor 612, an $N^{th}$ resistor 614 and an $(N+1)^{th}$ resistor. The resistors 610, 612, 614, 616 are connected in a serial chain with a first terminal of the first resistor 610 connected to the input of the variable gain amplifier 502A, a second terminal of the $(N+1)^{th}$ resistor connected to the ground reference 314 and forming a plurality (N) junction nodes 620, 624 (only two shown) that are connected to the respective second terminals 630B, 632B of the switches 630, 632.

Figure 6B:
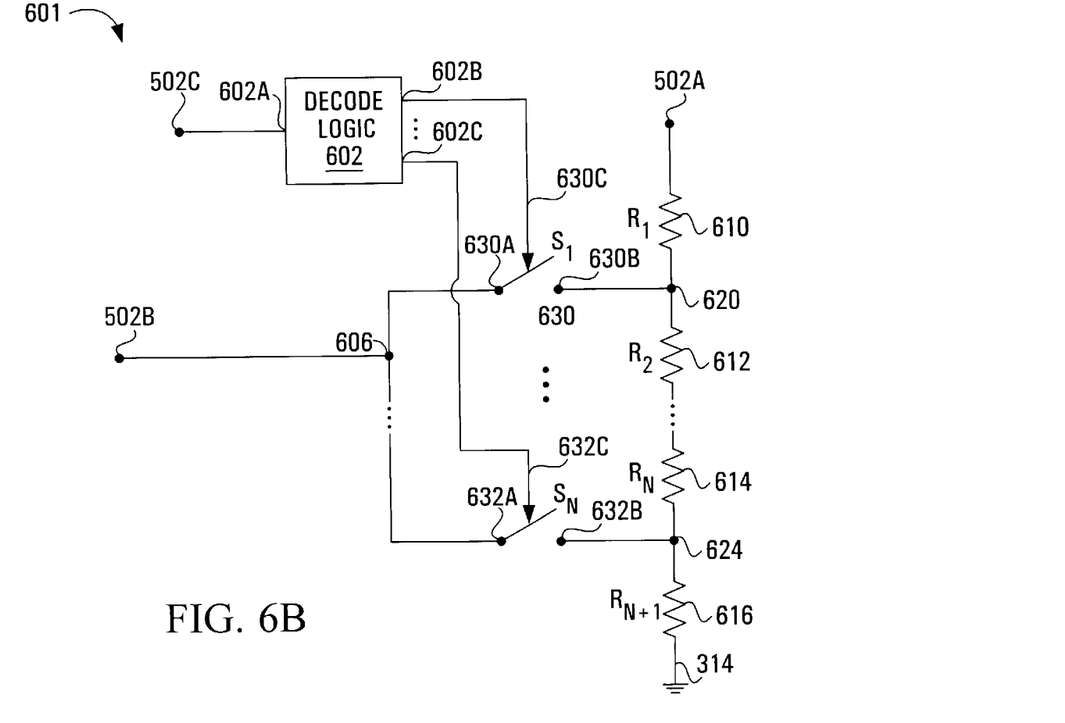
FIG. 6B a circuit diagram showing more detail of an alternative variable gain amplifier used in the preferred embodiment of FIG. 5.

FIG. 6B shows another possible implementation of the variable gain amplifier 502 of FIG. 5 that is identical to the implementation of FIG. 6A except that the buffer amplifier 604 is removed and the junction node 606 is connected to the output 502B of the variable gain amplifier 502.

Figure 7:
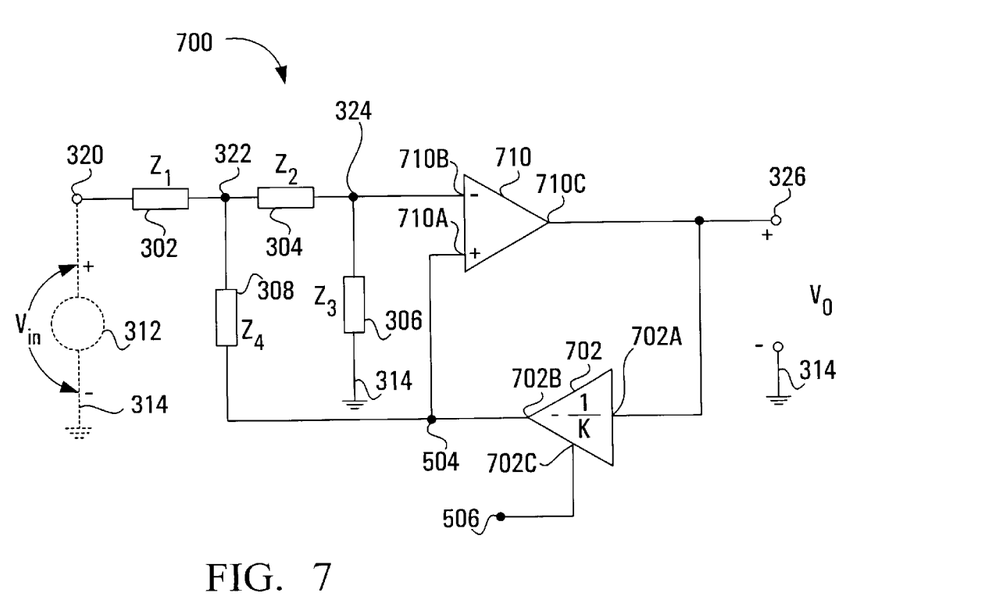
FIG. 7 is a circuit diagram of an alternative embodiment of the invention.

FIG. 7 shows an alternative embodiment of a line receiver 700 comprising a first impedance 302 ($Z_1$) having a first terminal connected to an input node 320 and a second terminal connected to a first junction node 322; a second impedance 304 ($Z_2$) having a first terminal connected to the first junction node 322 and a second terminal connected to a second junction node 324; a third impedance 306 ($Z_3$) having a first terminal connected to the second junction node 324 and a second terminal connected to a ground reference 314; a fourth impedance 308 ($Z_4$) having a first terminal connected to the first junction node 322 and a second terminal connected to a third junction node 504; an amplifier 710 that is preferably an opamp having a non-inverting input 710A connected to the third junction node 504, an inverting input 710B connected to the second junction node 324 and an output 710C connected to the output node 326; and a variable gain amplifier 702 having an input 702A connected to the output node 326 of the line receiver 700, an output 702B connected to the third junction node 504 and an AGC input 702C. The AGC input 702C is connected to an AGC feedback signal 506. The gain of the variable gain amplifier 702 is $$-\frac{1}{K}$$

and is a real number greater than zero. The value of K is set by the AGC feedback signal 506.

Figure 8:
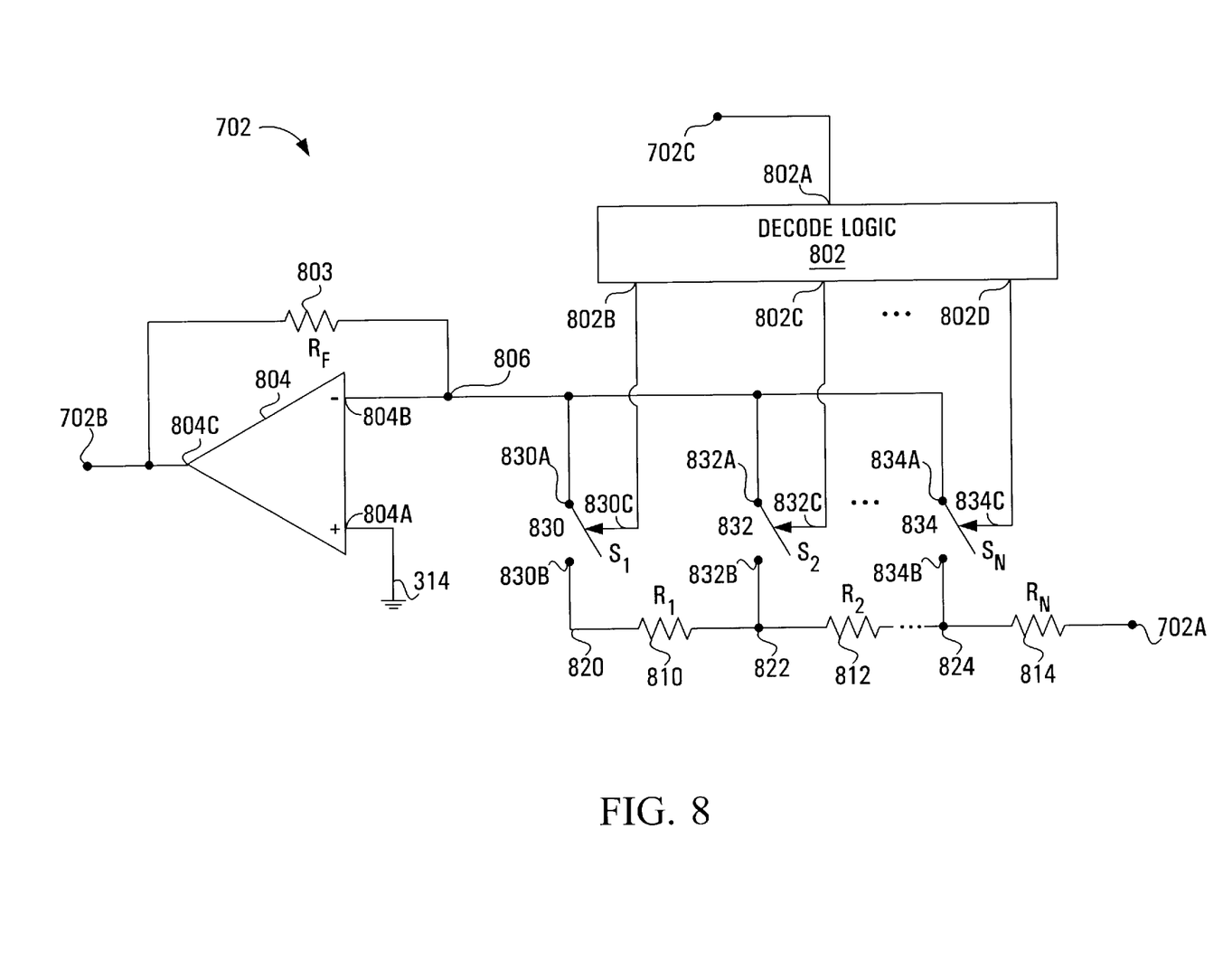
FIG. 8 is a circuit diagram showing more detail of a variable gain amplifier used in the alternative embodiment of FIG. 7.

FIG. 8 shows one possible implementation of the variable gain amplifier 702 of FIG. 7 that comprises a buffer amplifier 804 that is preferably an opamp having a non-inverting input 804A connected to a ground reference 314, an inverting input 804B connected to a node 806 and an output 804C connected to the output 702B of the variable gain amplifier 702. The variable gain amplifier 702 also comprises a feedback resistor 803 ($R_F$) having a first terminal connected to the output 804C of the amplifier 804 and a second terminal connected to the inverting input 804B of the amplifier 804. The variable gain amplifier 702 also comprises a decode logic circuit 802 that has an input 802A that is connected to the AGC input 702C of the variable gain amplifier 702 and a plurality of outputs 802B, 802C, 802D (only three shown). The variable gain amplifier 702 also comprises a plurality of switches 830, 832, 834 (only three shown) with each switch 830, 832, 834 having a first terminal 830A, 832A, 834A connected to the node 806, a control input 830C, 832C, 834C connected to the respective output 802B, 802C, 802D of the decode logic circuit 802 and a second terminal 830B, 832B, 834B. The variable gain amplifier 702 also comprises a plurality (N) of resistors (only three shown) shown as a first resistor 810, a second resistor 812 and an $N^{th}$ resistor 814. The resistors 810, 812, 814 are connected in a serial chain forming a plurality (N) junction nodes 820, 822, 824 with a first terminal of the first resistor 810 connected to the first junction node 820 and a second terminal of the $N^{th}$ resistor 814 connected to the input 702A of the variable gain amplifier 702. Each junction node 820, 822, 824 connected to a respective second terminal 830B, 832B, 834B of the switches 830, 832, 834.

In an alternative embodiment (not shown), the second terminal of the feedback resistor 803 is connected to the first junction node 820 instead of the node 806.

The gain of the line receiver 500 shown in FIG. 5 is given by:

$$\frac{V_O}{V_{IN}} = \frac{KZ_3Z_4}{Z_1Z_2 + Z_1Z_4 + Z_2Z_4 + Z_3Z_4}$$

In an xDSL communications system 100, shown in FIG. 1, it is advantageous that the xDSL receiver 110 in the CO 101 be a low-pass filter. To this end, the first impedance 302 is chosen to be a resistor having a value of $R_1$, the second impedance 304 is chosen to be a resistor having a value $R_2$, the third impedance 306 is chosen to be a capacitor having a value $C_3$ and the fourth impedance 308 is chosen to be a capacitor having a value of $C_4$. Hence $Z_1=R_1$, $Z_2=R_2$, $$Z_3 = \frac{1}{SC_3} \text{ and } Z_4 = \frac{1}{SC_4}$$

where the variable S represents complex frequency.

Therefore the gain of the xDSL receiver 110 in the CO 101 is given by:

$$\frac{V_O}{V_{in}} = \frac{K}{R_1 R_2 C_3 C_4 S^2 + (R_2 C_3 + R_1 C_3)S + 1}$$

This is a well known low-pass biquad function and hence $R_1$, $R_2$, $C_3$ and $C_4$ can be determined by conventional design methods.

Similarly, it is advantageous that the xDSL receiver 130 in the CPE 126 be a high-pass filter. To this end, the first impedance 302 is chosen to be a capacitor having a value of $C_1$, the second impedance 304 is chosen to be a capacitor having a value $C_2$, the third impedance 306 is chosen to be a resistor having a value $R_3$ and the fourth impedance 308 is chosen to be a resistor having a value of $R_4$. Hence $$Z_1 = \frac{1}{SC_1}, \quad Z_2 = \frac{1}{SC_2},$$

$Z_3=R_3$ and $Z_4=R_4$. Therefore the gain of the xDSL receiver 130 in the CPE 126 is given by:

$$\frac{V_O}{V_{IN}} = \frac{KS^2}{S^2 + \left(\frac{1}{R_3 C_1} + \frac{1}{R_3 C_2}\right)S + \frac{1}{R_3 R_4 C_1 C_2}}$$

This is a well known high-pass biquad function and hence $C_1$, $C_2$, $R_3$ and $R_4$ can be determined by conventional design methods.

The gain of the variable gain amplifier 502 is $$\frac{1}{K},$$

and the pass-band gain of the xDSL receiver 500 is K. By controlling the gain of the xDSL receiver 500 with an AGC (automatic gain control), the xDSL receiver 500 can amplify and filter inputs over a wide dynamic range with lower distortion and without saturation.

In the variable gain amplifier 600 of FIG. 6A the AGC signal 502C is decoded by the decode logic circuit 602 such that only one switch of the plurality of switches 630, 632 is closed at any time. The value of K is the ratio of the total resistance of the serial chain of resistors from the input 502A of the variable gain amplifier 600 to the ground reference 314 to the total resistance of the serial chain of resistors from the closed switch to the ground reference 314. The buffer amplifier 604 buffers the voltage at the junction node 606 and ensures that the current flowing through the closed switch is negligible. This eliminates distortion caused by non-linear properties of the switches 630, 632.

The operation of the variable gain amplifier 601 shown in FIG. 6B is similar that of the variable gain amplifier 600 shown in FIG. 6A. However, since there is no buffering of the voltage on the junction node 606 and the values of the resistors 610, 612, 614, 616 must be substantially lower than the value of the impedance $Z_4$ of FIG. 5.

The gain of the xDSL receiver 700 shown in FIG. 7 is similar to that of FIG. 5 except that $V_O$ is inverted so that the gain is given by:

$$\frac{V_O}{V_{IN}} = -\frac{KZ_3 Z_4}{Z_1 Z_2 + Z_1 Z_4 + Z_2 Z_4 + Z_3 Z_4}$$

In the variable gain amplifier 800 of FIG. 8 the AGC signal 702C is decoded by the decode logic circuit 802 such that only one switch of the plurality of switches 830, 832, 834 is closed at any time. The value of K is the ratio of total resistance from the second terminal of the closed switch to the input of the variable gain amplifier 702A to the feedback resistor 803.

While the preferred embodiment has been describe with respect to the xDSL communication system 100 of FIG. 1, those skilled in the art will appreciate that the invention is applicable to any line receiver application.

While the preferred embodiment of the present invention has been described and illustrated, it will be apparent to persons skilled in the art that numerous modifications and variations are possible. The scope of the invention, therefore, is only to be limited by the claims appended hereto.

I claim:

1. A receiver comprising:
   a first impedance having a first terminal for connection to a voltage source providing an input voltage with respect to a ground reference and a second terminal connected to a first junction node;
   a second impedance having a first terminal connected to the first junction node and a second terminal connected to a second junction node;
   a third impedance having a first terminal connected to the second junction node and a second terminal connected to the ground reference;
   a fourth impedance having a first terminal connected to the first junction node and a second terminal connected to a third junction node;
   a first amplifier having a non-inverting input connected to the second junction node, an inverting input connected to the third junction node and an output connected to an output node providing an output voltage with respect to the ground reference; and
   a variable gain second amplifier having an input connected to the output of the first amplifier, an output connected to the third junction node, an automatic gain control input and a gain of;

$$\frac{1}{K};$$

wherein the value of K is a real number greater than zero and set by the automatic gain control input.

2. The receiver of claim 1 wherein the first amplifier is an operational amplifier.

3. The receiver of claim 1 wherein the first impedance is a resistor, the second impedance is a resistor, the third impedance is a capacitor and the fourth impedance is a capacitor.

4. The receiver of claim 1 wherein the first impedance is a capacitor, the second impedance is a capacitor, the third impedance is a resistor and the fourth impedance is a resistor.

5. The receiver of claim 1 wherein the variable gain second amplifier comprises:
   a buffer amplifier having an output connected to the output of the variable gain second amplifier and input connected to a junction node;

a plurality of switches each having a first terminal connected to the junction node, a control input and a second terminal;

a decode logic circuit having an input connected to the automatic gain control input of the variable gain second amplifier, a plurality of outputs connected to respective control inputs of the switches; and a plurality of resistors connected in series from the input of the variable gain second amplifier to the ground reference and having a plurality of junction nodes connected to the respective second terminals of the switches.

6. The receiver of claim 5 wherein the decode logic circuit is arranged so that only one switch is closed at any time.

7. The receiver of claim 5 wherein the buffer amplifier is an operational amplifier connected in a unity gain configuration.

8. The receiver of claim 5 wherein the switches are selected from the group consisting of N-channel transistors, P-channel transistors and CMOS transistors.

9. The receiver of claim 1 wherein the variable gain second amplifier comprises:

a plurality of switches each having a first terminal connected to the output of the variable gain second amplifier, a control input and a second terminal;

a decode logic circuit having an input connected to the automatic gain control input of the variable gain second amplifier, a plurality of outputs connected to respective control inputs of the switches;

a plurality of resistors connected in series from the input of the variable gain second amplifier to the ground reference and having a plurality of junction nodes connected to the respective second terminals of the switches.

10. The receiver of claim 9 wherein the decode logic circuit is arranged so that only one switch is closed at any time.

11. The receiver of claim 9 wherein the switches are selected from the group consisting of N-channel transistors, P-channel transistors and CMOS transistors.

12. The receiver of claim 9 wherein the values of the plurality of resistors is much less than the fourth impedance.

13. A receiver comprising:

a first impedance having a first terminal for connection to a voltage source providing an input voltage with respect to a ground reference and a second terminal connected to a first junction node;

a second impedance having a first terminal connected to the first junction node and a second terminal connected to a second junction node;

a third impedance having a first terminal connected to the second junction node and a second terminal connected to a ground reference;

a fourth impedance having a first terminal connected to the first junction node and a second terminal connected to a third junction node;

a first amplifier having an inverting input connected to the second junction node, a non-inverting input connected to the third junction node and an output connected to an output node providing an output voltage with respect to the ground reference; and a variable gain second amplifier having an input connected to the output of the first amplifier, an output connected to the third junction node, an automatic gain control input and a gain of $$-\frac{1}{K};$$

wherein the value of K is a real number greater than zero and set by the automatic gain control input.

14. The receiver of claim 13 wherein the first amplifier is an operational amplifier.

15. The receiver of claim 13 wherein the first impedance is a resistor, the second impedance is a resistor, the third impedance is a capacitor and the fourth impedance is a capacitor.

16. The receiver of claim 13 wherein the first impedance is a capacitor, the second impedance is a capacitor, the third impedance is a resistor and the fourth impedance is a resistor.

17. The receiver of claim 13 wherein the variable gain second amplifier comprises:

a buffer amplifier having an output connected to the output of the variable gain second amplifier, non-inverting input connected to the ground reference and an inverting input connected to a junction node;

a feedback resistor having a first terminal connected to the output of the amplifier and a second terminal connected to the junction node;

a plurality of switches each having a first terminal connected to the junction node, a control input and a second terminal;

a decode logic circuit having an input connected to the input of the variable gain second amplifier, a plurality of outputs connected to respective control inputs of the switches; and a plurality of resistors connected in series to the input of the variable gain second amplifier and having a plurality of junction nodes connected to the respective second terminals of the switches.

18. The receiver of claim 17 wherein the decode logic circuit is arranged so that only one switch is closed at any time.

19. The receiver of claim 17 wherein the buffer amplifier is an operational amplifier connected in an inverting gain configuration.

20. The receiver of claim 17 wherein the switches are selected from the group consisting of N-channel transistors, P-channel transistors and CMOS transistors.

21. The receiver of claim 13 wherein the variable gain second amplifier comprises:

a buffer amplifier having an output connected to the output of the variable gain second amplifier, non-inverting input connected to the ground reference and an inverting input connected to a junction node;

a feedback resistor having a first terminal connected to the output of the amplifier and a second terminal;

a plurality of switches each having a first terminal connected to the junction node, a control input and a second terminal;

a decode logic circuit having an input connected to the input of the variable gain second amplifier, a plurality of outputs connected to respective control inputs of the switches; and a plurality of resistors connected in series between the input of the variable gain second amplifier and the second terminal of the feedback resistor; and having a plurality of junction nodes connected to the respective second terminals of the switches.

22. The receiver of claim 21 wherein the decode logic circuit is arranged so that only one switch is closed at any time.

23. The receiver of claim 21 wherein the buffer amplifier is an operational amplifier connected in an inverting gain configuration.

24. The receiver of claim 21 wherein the switches are selected from the group consisting of N-channel transistors, P-channel transistors and CMOS transistors.

* * * * *